April 9, 1963

M. KUTS 3,084,577

BRAKE CUP TRIMMER

Filed Dec. 10, 1959

INVENTOR.
MATHEW KUTS
BY
ATTY.

April 9, 1963   M. KUTS   3,084,577
BRAKE CUP TRIMMER
Filed Dec. 10, 1959   2 Sheets-Sheet 2

INVENTOR.
MATHEW KUTS
BY
W. A. Shira, Jr.
ATTY.

United States Patent Office 3,084,577
Patented Apr. 9, 1963

3,084,577
BRAKE CUP TRIMMER
Mathew Kuts, Akron, Ohio, assignor to The B. F. Goodrich Company, New York, N.Y., a corporation of New York
Filed Dec. 10, 1959, Ser. No. 858,789
9 Claims. (Cl. 82—48)

This invention pertains to apparatus for circumferentially cutting the walls of molded multi-walled annular elastomeric articles, and, more particularly, to apparatus for trimming the walls of molded double-walled annular rubber brake piston cups to remove mold rind and/or trim the walls of such cups so that the axial length of the inner wall is greater than that of the outer wall.

Doubled-walled annular rubber articles such as brake piston cups are generally formed by molding and hence, upon removal from the mold, they have a fin, or rind, located about the circumference of each of the free ends of their walls. To allow for removal of this rind, which must be trimmed off before a cup is usable as a fluid seal member in a piston, the walls of the cup are molded to a length greater than that desired in the finished cup. Also, it is conventional to mold both walls of the same axial length although in certain types of piston cups it is necessary, for proper cup performance, that the inner wall have a greater axial length than that of the outer wall.

It has been customary in the past to effect the necessary cutting of double-walled brake piston cups to remove the mold rind and provide the desired wall length by two separate operations each necessitating a different cutting machine set-up. In the first of such operations a cup was placed over a tapered, annular chuck fitting between the two walls of the cup, the cup being held on the end of the chuck by means of a tailstock. The cup was rotated by means of the chuck and a knife blade was engaged with the cup cutting through the outer wall thereof and penetrating a circumferential groove in the chuck. The cup was then removed from the chuck and the chuck was replaced by a smaller, similar chuck which accommodated the inner wall of the cup. Then the knife blade position was adjusted for the inner wall cut and the cutting operation on the inner wall was conducted similarly to that for the outer wall.

The principal object of this invention is to provide an improved apparatus by which, in one continuous operation, the inner and outer walls of double-walled piston cups are cut to different axial lengths, the apparatus being so constructed and arranged that the cups are held on the chuck by vacuum and no tailstock is necessary.

Another object of this invention is to provide an improved, rapidly operating apparatus which permits, in one continuous, semiautomatic operation, cutting of the inner and outer walls of double-walled piston cups to different axial lengths, the apparatus being so constructed and arranged that centrifugal force developed by the high rotational speed of the chuck obviates the necessity for internal support of the cup during the cutting of each wall.

A further object of this invention is to provide an improved apparatus as defined in the preceding paragraph, wherein the cutting knife is automatically moved, upon completion of its cut through the outer wall of the cup, to a new cutting position for cutting the inner wall.

A still further object of this invention is to provide an apparatus as defined in the preceding paragraph, wherein the cutting knife is automatically returned to its original cutting position upon completion of its cut through the inner cup wall.

A still further object of this invention is to provide apparatus as defined in the preceding paragraph, wherein the said knife movement is effected by fluid pressure actuated means and the cup is automatically released from the chuck during return of the cutting knife to its original position by exhausting the fluid from the knife moving means into the vacuum line for the chuck.

The invention further resides in certain novel features of the construction and in the combination and arrangement of the apparatus parts, and further objects and advantages of the invention will be apparent from the following description of the presently preferred embodiment described with reference to the accompanying drawings forming a part of this application in which.

Figure 5:
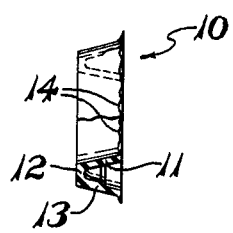
FIG. 5 is a view, partly in elevation and partly in section, of a piston cup as molded and before trimming, showing the mold rind about the edges of the cup walls.
Figure 7:
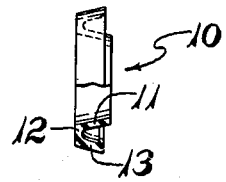
FIG. 7 is a view, partially in elevation and partially in section, of a finished piston cup after outer and inner walls are trimmed.

The presently preferred form of the apparatus embodying this invention is illustrated in the drawings as a machine for mounting, rotating and semi-automatically trimming the walls of a molded piston cup 10. As molded, a piston cup 10, see FIG. 5, comprises an inner annular wall 11 joined at the base 12 of the cup to an outer annular wall 13, there being a fin or mold rind 14 at the free ends of the walls 11, 13. In order for the cup to effect a satisfactory fluid seal in a piston it is necessary to remove the mold rind 14 and trim the cup walls 11 and 13 so that inner wall 11 has a greater axial length than the outer wall 13.

Figure 1:
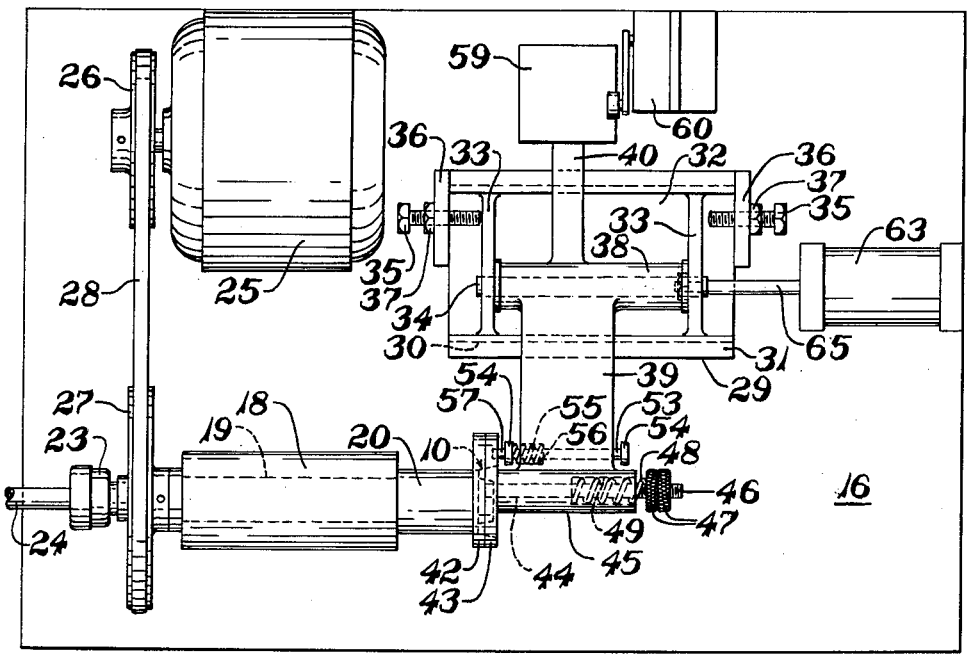
FIG. 1 is a plan view of the apparatus in its presently preferred form positioned for initiating a piston cup trimming operation.
Figure 2:
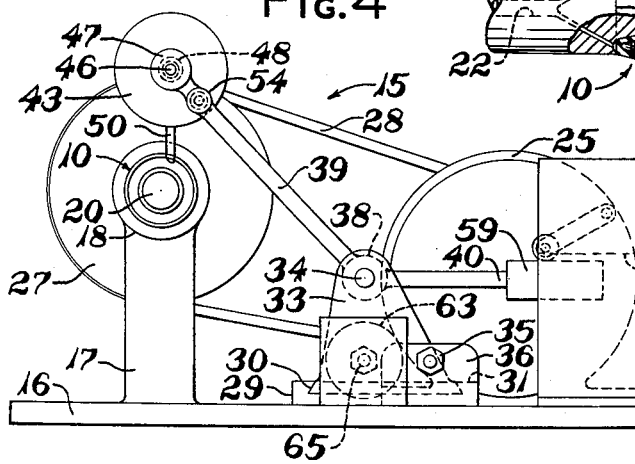
FIG. 2 is a side elevational view of the apparatus showing the knife as it is completing its cut through the outer cup wall.
Figure 6:
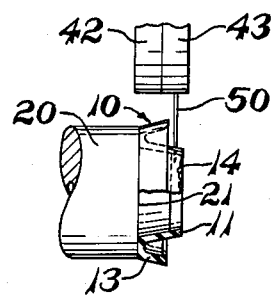
FIG. 6 is a fragmentary front elevational view, showing the knife blade making its cut through the inner wall of the piston cup, the latter being shown partly in section.

The piston cup trimming machine 15, see FIGS. 1 and 2, comprises a suitable base plate 16 provided with a vertical support 17 the upper end of which carries a horizontal bearing 18 which rotatably supports a hollow shaft 19 with the shaft extending beyond both ends of the bearing. One end of the shaft 19 is provided with a chuck 20 for receiving the piston cup with the face of the chuck having a central portion of generally frusto-conical shape terminating at the base in a generally radially extending shoulder 21. The chuck also has furcated passageways 22 leading from the hollow portion of shaft 19 to the shoulder portion 21 of the chuck, and the shaft 19 is connected, by means of a rotatable joint 23, to a vacuum line 24, thus effecting a continuous passageway for the application of a vacuum to the shoulder portion of the chuck. The chuck 20 is rotatable at high speed preferably in the order of 4200 r.p.m., by a motor 25 connected to the shaft 19 by means of belt sheaves 26 and 27 and a belt 28 passing about the sheaves.

Mounted on base plate 16 in parallel relationship to the chuck 20 is a block 29 having a dovetail way 30 cut in its upper surface 31. Slidably mounted in the dovetail way 30 is a dovetail block 32 carrying a vertical support 33 at either end thereof which mount a fixed horizontal shaft 34. The travel of dovetail block 32 is limited by adjustable stop screws 35 threaded in vertical supports 36 at either end of the block 29, the screws being held in adjusted position by lock nuts 37.

Figure 4:
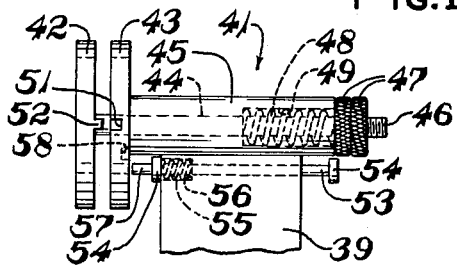
FIG. 4 is a fragmentary, front elevational view, showing additional details of the knife blade holder in its open position for receiving the removable knife blade.
Figure 3:
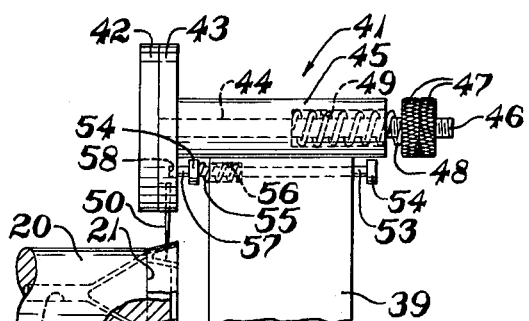
FIG. 3 is a fragmentary, front elevational view, partly in section, showing details of the chuck and the knife blade holder.

The shaft 34 rockably supports a bearing 38 which carries two circumferentially spaced, radially extending arms 39 and 40. At the outer end of arm 39 is mounted a knife holder assembly 41, see FIGS. 3 and 4, comprising two spring loaded adjacent discs 42 and 43. The disc 42 is integral with or connected to one end of a shaft 44 which passes through a central opening in the disc 43 and through a bore in a bearing 45 which is mounted on the end of arm 39. The other end of shaft 44 is threaded, as at 46, to receive two knurled lock nuts 47. The discs 42 and 43 are normally held against one another and the end of bearing 45 by means of a spring 48 received in a counterbore 49 of the bearing 45 and compressed between the inner end of the counterbore and the lock nuts 47. A disposable knife blade 50 is positioned in a slot 51 in disc 43, and is held therein by a matching lug 52 on disc 42 under action of the spring 48, the parts being shown in separated position in FIG. 4.

A locking pin 53 is also mounted on the arm 39 near the end thereof and passing therethrough. This pin is provided with stop shoulders 54 mounted adjacent either end thereof which limit axial movement of the pin. A spring 55 compressed between one stop shoulder 54 and a recess 56 in arm 39 normally urges the pin to a position in which an end 57 thereof registers in a locating recess 58 in disc 43, see FIG. 3, thus preventing rotation of the gripping discs 42, 43 and the knife blade 50. When it becomes necessary to replace the knife blade 50 it is desirable to have the blade turned toward the operator for visual accessibility. To accomplish this, the operator removes the end 57 of pin 53 from its normal register with locating recess 58 and rotates the discs 42 and 43 until the blade 50 is in a generally horizontal position facing the operator. The operator then depresses the end of shaft 44, overcoming the force of spring 48, thereby allowing separation of discs 42 and 43 so that the blade 50 is freely removable from its positioning slot 51. After a new blade has been inserted in slot 51, shaft 44 is released, thus urging discs 42 and 43 together to grip the new blade 50 between the discs 42 and 43 which are then rotated until the end 57 of pin 53 snaps into the positioning recess 58 thus preventing further rotation of the discs.

Figure 8:
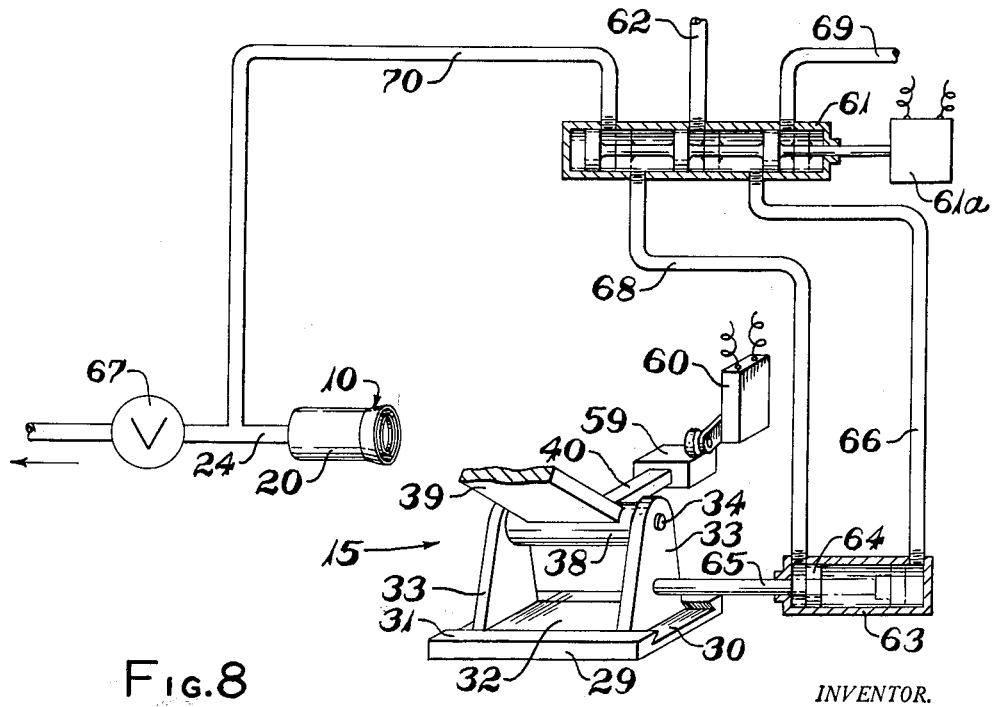
FIG. 8 is a fragmentary, somewhat schematic, perspective view showing the cooperating relationship of the fluid pressure operating mechanism for the apparatus.

The outer end of arm 40 is provided with a counterweight 59 engageable with the actuating arm of a limit switch 60. The limit switch is connected to control the energization of the actuating solenoid 61a of a solenoid operated valve 61, seen only in FIG. 8, which directs the flow of compressed air from a feed line 62 sequentially to either end of a double acting pneumatic cylinder 63 for actuation of the piston 64. Piston 64 is connected to the right hand vertical support 33, as seen in FIGS. 1 and 8, by means of piston rod 65. Hence, movement of the knife assembly axially of the chuck is under control of switch 60 with the extent of travel of the knife assembly being determined by the positions of stop screws 35.

In operation, the operator places an untrimmed piston cup 10 on the rotating chuck 20, the cup being held by a vacuum drawn therethrough by virtue of its connection with vacuum line 24 and normally open, manually operated valve 67. At this time the solenoid operated valve 61 is in the position shown in full lines in FIG. 8 so that air from line 62 is directed through line 66 to the cylinder 63 and against the right side of the piston 64 to force it and the knife holder assembly 41 to the left, as seen in FIG. 1, to the position determined by the stop screw 35 at the left of block 29. In addition to the vacuum line 24 creating a vacuum at the chuck 20, it also exhausts the cylinder 63 on the left side of piston 64.

The operator now manually lowers the knife holder assembly 41 so that the blade 50 comes into cutting engagement with the outer wall 13 of the rapidly rotating piston cup 10, the speed of rotation being such that the wall, by means of the centrifugal force developed therein, resists the radial force exerted by the knife and is cut thereby. As the blade 50 completes its cut through the outer cup wall 13 the counterweight 59 on arm 40 is raised into engagement with limit switch 60. This causes the solenoid 61a to move the solenoid valve 61 to the position shown in dotted lines in FIG. 8. Hence, compressed air is now admitted through air line 68 to the left of piston 64 in air cylinder 63 as viewed in FIG. 8. Consequently, piston 64 is forced to the right moving the knife holder assembly 41 to the right, until the right hand vertical support 33, as viewed in FIG. 1, abuts against right hand stop screw 35. At this time the right side of the cylinder 63 is exhausted through lines 66 and 69.

With the knife blade 50 in the new cutting position the operator continues his trimming operation by cutting through the inner cup wall 11 by his continued rocking of the knife assembly. Upon completion of the cut through the inner wall the operator closes vacuum line valve 67 and releases the knife holder assembly 41 allowing it to swing up due to the downward movement of counterweight 59. As the counterweight 59 disengages limit switch 60 the solenoid valve 61 returns to the full position shown in FIG. 8 allowing air from line 62 to again pass through line 66 to force piston 64 to the left-hand end of the air cylinder 63 thereby returning the knife holder assembly 41 to its original position. The air in the left end of the cylinder 63 is simultaneously exhausted through lines 68 and 70 to line 24. Since the valve 67 is now closed this air is forced out through the passageway 22 in chuck 20 to blow the piston cup 10 off the chuck. The machine is then ready to receive a new, untrimmed cup.

It is to be understood that, although the invention is herein shown and described as requiring certain manual operations, the same principles may be easily incorporated in a fully automatic machine by those experienced in the art. Likewise, various changes in the construction and arrangement of parts may be resorted to within the ambit of the invention as defined in the appended claims.

Having thus described the invention, I claim:

1. Apparatus for trimming the annular walls of a multi-walled annular rubber article to different axial lengths, comprising rotatable article supporting means for supporting and rotating a multi-walled annular article by one end thereof, cutting means rockably mounted on said apparatus adjacent the supporting means for rocking movement in a plane perpendicular to the axis of rotation of said supporting and rotating means to and from circumferential cutting engagement with the walls of an article supported by said supporting means, and apparatus means responsive to a first predetermined rocking movement of said cutting means in the direction of said cutting engagement to move said cutting means parallel to said axis a predetermined distance to a position for continued rocking movement of said cutting means in the direction of said cutting engagement in a plane parallel to the plane of said first rocking movement whereby an inner wall of said article is cut to a different axial length than an outer wall of said article.

2. Apparatus for trimming the annular walls of a multi-walled annular rubber article, said walls being connected adjacent one end with their other ends extending in radially spaced unconnected relationship; the said apparatus comprising rotatable article supporting means to support a multi-walled annular article by one end thereof with the free ends of the walls extending beyond the supporting means; article wall cutting means movably mounted on said apparatus adjacent the said supporting means for rocking movement in a plane perpendicular to the axis of rotation of said supporting means; means to rotate said supporting means at a speed of rotation sufficient for each of said walls of a multi-walled annular article supported thereby to resist radial deflection due to cutting force exerted thereon by said cutting means; and apparatus means responsive to a predetermined rocking movement of said cutting means toward said axis to move said cutting means a predetermined distance in a direction parallel to said axis to a position for further rocking movement toward said axis whereby an inner wall of said article is cut to a different axial length than an outer wall of said article without reverse rocking of said cutting means.

3. Apparatus for trimming the radially spaced annular walls of a multi-walled annular rubber article to different axial lengths, comprising rotatable means to grip and rotate a multi-walled annular article by one end thereof, cutting means supported on said apparatus at a first position adjacent said article gripping means for rocking movement perpendicular to the axis of rotation of said rotatable means, apparatus means to move said cutting means in a direction parallel to said axis a predetermined distance from said first location to a second position for continued rocking movement perpendicularly to said axis and to return said cutting means to the said first location, and means actuating said moving means in response to predetermined rocking movements of said cutting means.

4. Apparatus for trimming the annular walls of a multi-walled annular rubber article in which the walls are connected adjacent one end with their other ends extending in radially spaced unconnected relationship, said apparatus comprising rotatable article supporting means to support and rotate an article by one end thereof, a knife holder movably supported adjacent the article supporting means for rocking movement in a plane perpendicular to the axis of rotation of said rotatable means, a knife removably held by said holder to circumferentially cut the walls of an article supported by said supporting means as said knife holder is rocked towards the axis of rotation of said supporting means, and apparatus means responsive to a predetermined rocking movement of said holder towards said axis to move said knife holder a predetermined distance in a direction parallel to said axis from the plane of its cut through one wall of an article supported by said supporting means to a position for cutting the next adjacent wall of said article without intermediate reverse rocking of said knife.

5. Apparatus for trimming the radially spaced annular walls of a multi-walled annular rubber article to axially different lengths with an outer wall being cut to a length shorter than that of a succeeding adjacent inner wall, said apparatus comprising a rotatable chuck to support and rotate a multi-walled annular article by one end thereof, knife means rockably mounted on said apparatus for movement toward and away from the axis of rotation of said chuck in a plane perpendicular to said axis, fluid pressure means to sequentially move said knife means from said plane to a second position for continued movement of said knife means toward said axis and to return said knife means to said plane upon completion of said movement toward said axis, and means responsive to predetermined radial movements of said knife means toward and away from said axis controlling application of fluid under pressure to said fluid pressure means.

6. Apparatus for trimming the radially spaced annular walls of a multi-walled annular rubber article to different axial lengths with the outer wall being cut to a length shorter than that of the inner wall, said apparatus comprising a base plate, a hollow shaft rotatably mounted upon said base plate, an article supporting chuck having a passageway for fluid therein mounted on one end of said shaft with the said passageway communicating an article engaging surface of the chuck with the bore of said shaft, means to draw a vacuum through said shaft and chuck passageway to thereby hold an article on said chuck, cutting means movably supported on said base plate adjacent said chuck for rocking movement in a plane perpendicular to the axis of rotation of said chuck to move radially toward and away from said axis, means to sequentially move said cutting means a predetermined distance axially relative to said chuck, and means responsive to predetermined rocking movements of said cutting means to effect said axial movement.

7. Apparatus for trimming the radially spaced annular walls of a multi-walled annular rubber article to different axial lengths with the outer wall being cut to a length shorter than that of the adjacent inner wall; said apparatus comprising a base plate; rotatable means mounted on said base plate to grip and rotate a multi-walled annular article by one end thereof; a carriage slideably mounted on said base plate for movement parallel to the axis of rotation of said rotatable means; a bearing rockably mounted on said carriage; two radially extending arms mounted on said bearing; a cutting means mounted on one of said arms for rocking movement in a plane perpendicular to said axis radially to and from cutting engagement with the walls of an article gripped by said rotatable means; a counterweight mounted on the other arm normally urging the said cutting means away from said axis; and means responsive to predetermined movement of said cutting means towards said axis to move said carriage and cutting means a predetermined distance parallel to said axis from a first location to a second position, and to return said carriage and cutting means to said first location in response to movement of the cutting means away from said axis.

8. Apparatus for trimming the annular walls of a multi-walled annular rubber article in which the walls are connected adjacent one end with their other free ends extending in radially spaced, unconnected relationship; said apparatus comprising support means to support and rotate a multi-walled annular article by one end thereof with the free ends of said walls extending beyond the support means; a knife holder assembly; means movably supporting said assembly for rocking radial movement toward and from the axis of rotation of said support means in a plane perpendicular to said axis and for axial movement parallel thereto; said knife holder assembly including: a rotatable shaft, a first jaw mounted on said shaft, a second jaw slideably mounted on said shaft, one of said jaws having a recess cut in the gripping face thereof, a projection on the gripping face of the other jaw registerable with the said recess, spring means normally urging said jaws yieldably one against the other, a disposable knife blade removably gripped in said recess, locating means removably engageable with one of said jaws to position said jaws and said knife blade gripped therebetween in cutting position; and means responsive to a predetermined rocking movement of said assembly towards said axis and corresponding to the completion of the cutting of the outer wall of an article supported by said support means to move said assembly a predetermined distance parallel to said axis to a position for cutting an adjacent inner wall of said article, and responsive to rocking of the assembly away from said axis to return said assembly to its original position after a second predetermined rocking movement towards said article corresponding to the completion of the cutting of said inner wall.

9. Apparatus for trimming the radially spaced annular walls of a multi-walled annular rubber article to different axial lengths; comprising rotatable means including a chuck provided with passageways to rotatably support a multi-walled annular article by one end thereof by the application of a vacuum thereto through said passageways; cutting means rockably supported for radial movement relative to the axis of rotation of said rotatable means to circumferentially cut the walls of an article supported by said chuck as said article is rotated; a fluid pressure cylinder; a piston movably mounted in said cylinder; a piston rod connected to said piston; means connecting said cutting means to said piston for movement of said cutting means parallel to the axis of rotation of said chuck; sensing means responsive to a predetermined rocking movement of said cutting means, corresponding to the completion of the cutting of the outer wall of an article supported by said chuck, to direct fluid under pressure into said cylinder on one side of said piston and to relieve fluid pressure from the other side of said piston to thereby move said cutting means a predetermined distance parallel to said axis to a second position for cutting the inner wall of an article supported by said chuck, the said sensing means responding to the retraction of said cutting means away from said axis to direct fluid under pressure to the said other side of said piston thereby returning the said cutting means to its initial position and to direct the fluid under pressure from the said one side into said passageway to thereby blow therefrom an article supported by said chuck.

References Cited in the file of this patent

UNITED STATES PATENTS

| | | |
|---|---|---|
| 627,236 | Oakley | June 20, 1899 |
| 728,424 | Steffee | May 19, 1903 |
| 898,732 | Fishering | Sept. 15, 1908 |
| 1,036,763 | Wills | Aug. 27, 1912 |
| 1,592,933 | Hammond | July 20, 1926 |
| 1,748,474 | Granert | Feb. 25, 1930 |
| 1,925,498 | Plante | Sept. 5, 1933 |
| 1,942,986 | St. John | Jan. 9, 1934 |
| 2,457,310 | Judelshon | Dec. 28, 1948 |
| 2,699,084 | Ovshinsky | Jan. 11, 1955 |
| 2,807,180 | Adams | Sept. 24, 1957 |
| 2,903,934 | Montgolf | Sept. 15, 1959 |